United States Patent [19]

Peterson

[11] Patent Number: 5,229,197
[45] Date of Patent: Jul. 20, 1993

[54] BLENDED CPE/CRYSTALLINE THERMOPLASTIC POLYOLEFIN MEMBRANE

[75] Inventor: Arnold G. Peterson, Kernersville, N.C.

[73] Assignee: JPS Elastomerics Corporation, Northampton, Mass.

[21] Appl. No.: 736,259

[22] Filed: Jul. 26, 1991

[51] Int. Cl.⁵ .................... B32B 27/12; B32B 27/32
[52] U.S. Cl. .................... 428/246; 428/141; 428/247; 428/255; 428/516
[58] Field of Search .............. 428/246, 247, 255, 516

[56] References Cited

U.S. PATENT DOCUMENTS 4,978,703 12/1990 Ainsworth et al. ............... 525/192
4,978,716 12/1990 Flynn et al. ..................... 525/192

*Primary Examiner*—James C. Cannon
*Attorney, Agent, or Firm*—Fishman, Dionne & Cantor

[57] ABSTRACT

A blend of CPE and crystalline thermoplastic polyolefin (e.g., ultralow density polyethlene) is presented. This material is easily processed on the rolls of a rubber-mill (i.e., calender) to form continuous sheets of membrane suitable for use in single ply roofing and other similar applications. In a preferred embodiment, a membrane formed from the composition of this invention is used as the bottom layer of a multilayer single ply roof with the upper layer or layers comprising known materials.

27 Claims, 1 Drawing Sheet

BLENDED CPE/CRYSTALLINE THERMOPLASTIC POLYOLEFIN MEMBRANE

BACKGROUND OF THE INVENTION

This invention relates generally to a flexible polymeric membrane. More particularly, this invention relates to a flexible polymeric membrane for a roof or in other applications such as fluid containment liners and covers (e.g., reservoir and land fill lines and covers).

While the present invention will be described in connection with a roof application, it will be appreciated that the roof membrane disclosed herein may also be useful in other applications requiring weldable, water resistant, chemical resistant polymeric membranes.

In certain modern roofing installations for commercial buildings, a layer of insulation is secured to the deck of the roof and then is covered with sheets of flexible material. Adjacent margins of adjacent sheets are sealed together (e.g., heat welded) in overlapping relationship and thus the sheets form a sealing membrane over the insulation.

The sheets which form the membrane are secured to the insulation and the underlying roof deck at spaced locations by fastener assemblies which are spaced along the margins of the sheets. Each fastener assembly comprises a washer-like disc and further comprises a screw adapted to thread into the roof deck to cause the disc to clamp the membrane downwardly against the insulation.

Typical roof membranes have been made from polyvinylchloride (PVC), vulcanized ethylene-propylene-/diene (EPDM), chlorosulfonated polyethylene (Hypalon by DuPont), and chlorinated polyethylene (CPE). Less typically, membranes have been made from polyisobutylene (PIB), neoprene and modified bitumens.

U.S. Pat. Nos. 4,910,245, 4,978,703 and 4,978,716 (the entire contents of which are incorporated herein by reference) disclose a roof membrane generally comprised of a blend of an amorphous chlorinated polyethylene (CPE) resin, a crystalline thermoplastic polyolefin (e.g., extra low density polyethylene) resin, a plasticizing material, and a vulcanizing package comprising an inorganic base and 2,5-dimercapto-1,3,4-thiadiazole or a derivative thereof. During manufacture, the CPE is dispersed in the polyolefin and the CPE is vulcanized to form a vulcanizate dispersed in the polyolefin. This vulcanizate polyolefin blend is then dispersed into additional CPE (which is not vulcanized) forming a partially crosslinked thermoplastic polyethylene vulcanizate. This material is processable in an internal mixer (such as Banbury Mixer) and may be calendered on conventional calendering equipment (e.g., rubber mill) to form continuous sheets suitable for use as single ply roofing and in other applications such as reservoir liners and the like. This material is sometimes referred to as a thermoplastic vulcanizate or TPV.

While well suited for its intended purposes, the above-described TPV material has certain drawbacks and deficiencies. For example, processing the TPV requires crosslinking of expensive vulcanizing packages such as the 2,5-dimercapto-1,3,4-thiadiazole. In addition, the TPV processing comprises a three stage mixing process which leads to undesirably long manufacturing time periods as well as high cost. This mixing process also requires a relatively precise mixing schedule in order to insure high quality. Because of the three stages of mixing, the maintenance of such quality standards at each stage can be difficult. Still another problem is that the discrete particles of the CPE vulcanizate (blended into the non-vulcanized CPE/polyethylene matrix) may not be suitably fused to form a bond to the matrix leading to reduced physical and chemical properties such as reduced weatherability and chemical resistance.

Yet another disadvantage relates to the sealability (heat welding) of the TPV material which is reduced because of the presence of the vulcanized CPE phase.

SUMMARY OF THE INVENTION

In accordance with the present invention, a blend of CPE and crystalline thermoplastic polyolefin (e.g., ultralow density polyethlene) is provided which lacks the discrete vulcanized CPE phase and crosslinking (vulcanizing agent) of the above-discussed U.S. Pat. Nos. 4,910,245, 4,978,703 and 4,978,716. This material is easily processed on the rolls of a rubbermill (i.e., calender) to form continuous sheets of membrane suitable for use in single ply roofing and other similar applications. In a preferred embodiment, a membrane formed from the composition of this invention is used as the bottom layer of a multilayer single ply roof with the upper layer or layers comprising known materials (including the prior art TPV material).

The present invention has many features and advantages relative to the prior art. For example, because the present invention does not include the vulcanized CPE phase, the resultant material is much lower in cost and uses a substantially improved manufacturing process. Significantly, the material of this invention has improved sealability (e.g., heat welding) relative to the prior art TPV. Improved heat welding is important in single ply roofing applications in the provision of leak proof and easily obtainable seams between overlapping membrane sheets.

The fact that the CPE/crystalline thermoplastic polyolefin (low density polyethylene) blend of this invention provides a smooth processable sheet on calendering equipment is surprising and unexpected. It was believed that such a blend would have been too soft and sticky to be processable on conventional calendering equipment without the additional vulcanized CPE phase taught by the aforementioned prior art patents. In other words, it was thought that the additional vulcanized CPE phase was needed to provide stability and structural integrity, particularly at the high processing temperatures of approximately 300° F. Typically, low density polyethylenes of the type used in this invention are not processable by a calendering method; but rather must be used in extrusion and blown film equipment. However, it was discovered that the heat stabilized CPE low density polyethylene blends of this invention were easily and efficiently processable on a calender to provide sheets having excellent mechanical, chemical and heat welding properties.

The above-discussed and other features and advantages of the present invention will be appreciated and understood by those of ordinary skill in the art from the following detailed description and drawings.

BRIEF DESCRIPTION OF THE DRAWING

The single FIGURE depicts a single ply roof membrane composed of a bottom layer made from the present invention and a top layer fused to the bottom layer.

BRIEF DESCRIPTION OF THE PREFERRED EMBODIMENT

Figure 1:
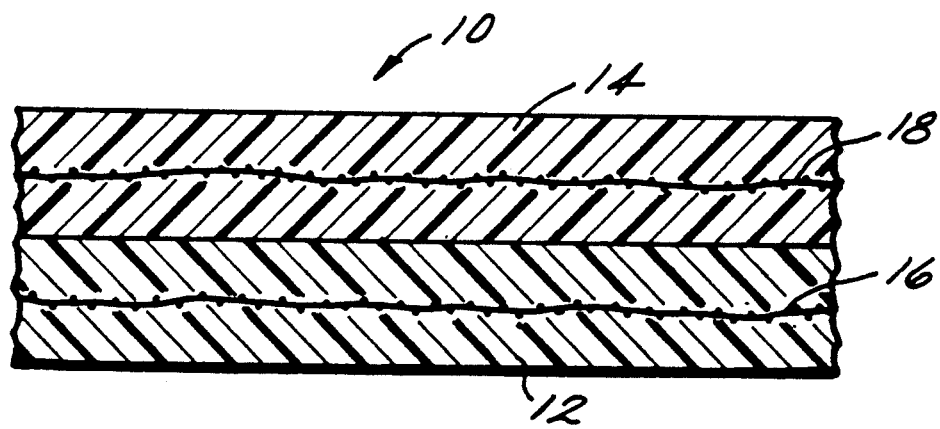

The present invention comprises a blend of chlorinated polyethylene (CPE) resin (about 30 to about 70 parts by weight) and crystalline polyolefin resin (about 30 to about 70 parts by weight). In addition, at least one heat stabilizer, a blend enhancing agent and suitable processing aids are added to the blend.

The CPE and polyolefin resins suitable for use in the present invention are the same as those disclosed in the aforementioned U.S. Pat. Nos. 4,910,245, 4,978,703 and 4,978,716, which have already been incorporated herein by reference. The preferred polyolefin is low density polyethylene. Suitable commercial polyolefin resins include ATTANE 4004 manufactured by Dow Chemical Company and FLEXOMER 9065 manufactured by Union Carbide Company. Suitable commercial CPE resins include PARACHLOR 125X sold by Uniroyal Chemical Company, Inc. and TYRIN 725 manufactured by Dow Chemical Company.

The heat stabilizer (preferably 1 to 5 parts by weight) of the polymer is an important component of this invention as it improves processing during mixing and calendering. Suitable heat stabalizers include magnesium hydroxide such as VERSAMAG manufactured by Morton Thiokol. Other heat stabalizers are noted in the aforementioned patents.

The blend enhancing agent (preferably 2 to 10 parts by weight) is also an important component in the present invention. Such blend enhancing agents permit blending of rubbers and other materials that are incompatible and thereby improves the processibility of such materials. In the case of the present invention, the blend enhancing agent comprises a low molecular weight polymer made from cyclo-octene by metathesis polymerization such as is available from HULS A.G. under the trademark VESTENAMER 8012.

Other optional processing aids include calender roll releases or lubricants (perferably 1 to 3 parts by weight) such as stearic acid, polyethylene glycol (CARBOWAX manufactured by Union Carbide), polyethylene wax (EPOLENE N34P from Eastern Chemical Products), antioxidants for preventing polymer resin degradation (preferably 0.5 to 1.5 parts by weight) such as IRGANOX B225 from Ciba-Geigy Corp., flame retardants (preferably 15 to 40 parts by weight) such as alumina trihydrates (MICRAL 932SL from Solar Industries), and acid scavenger stabalizers for preventing liberation of HCl from the CPE (preferably 1 to 5 parts by weight) such as ERL 4221 from Union Carbide.

Filler materials, not to exceed 30 parts by weight to 100 parts of polymer resin, such as Camel Wite, a calcium carbonate by Genstar Stone Products, or a surface coated precipited calcium carbonate, trade name Ultra-Pflex by Pfizer may be used. Excessive filler usage over 30 PHR can reduce the seamability of the membrane material.

Coloring agents of Titanium Dioxide, such as Tipure R960 by DuPont may be blended at 1 to 10 PHR to obtain a white color or blended with any color pigment such as the phthalocyamine type or any other type common to the rubber trade to obtain a desired color from pastel to mass tones, the levels discussed herein are only suitable for the down side or non exposed bottom side of a sheet of membrane. Levels for a non white pigment are 0.001 to 3.0 PHR.

Referring now to the FIGURE, a membrane suitable for use on a single ply roof is shown generally at 10. Membrane 10 includes a bottom layer 12 comprised of the CPE/polyolefin blend of the present invention fused (under heat and pressure) to an upper sheet 14. Upper sheet 14 may be comprised of any suitable roofing membrane which is heat sealable to bottom layer 12. Preferably, upper layer 14 comprises the material of the aforementioned U.S. Pat. Nos. 4,910,245, 4,978,703 and 4,978,716. In that case, upper layer 14 may comprise a blend of 35 to about 45 parts by weight of an admixture of a crosslinked amorphous chlorinated polyethylene, about 15 to about 25 parts by weight of a crystalline thermoplastic polyolefin resin, the crosslinking being carried out in the presence of a vulcanizing package comprising an inorganic base and (1) 2-5. dimercapto-1,3,4-thiadiazole and an activator material or (2) a derivative of 2,5-dimercapto-1,3,4-thiadizole initially present at from about 0.5 to about 1.5 parts by weight, the residue of which is present, and from about 8 to about 15 parts by weight of semicrystalline chlorinated polyethylene dispersed therethrough as the continuous phase, forming a partially crosslinked blend elastomer which is resistant to environmental cracking. The upper layer 14 may also comprise chlorosulfonated polyethylene such as HYPALON from DuPont providing a suitable vulcanizing package is used.

In general, the upper layer 14 will have better weatherability characteristics than the material of the present invention. However, the present invention provides excellent heat welding characteristics to the overall membrane 10 since such membranes are applied by overlapping adjacent sheets and heat welding the overlapped sections together. As the bottom layer 12 in a multilayer single ply roofing membrane 10, the present invention significantly lowers the overall cost of the membrane and significantly improves the sheet-to-sheet sealing characteristics.

Preferably, each layer 12, 14 of membrane 10 includes a reinforcement fabric or scrim 16, 18, respectively. Typically, polyester 10×10,1000 denier plain weave.

The following non-limiting examples A-U disclose various formulations of the present invention which were calendered into a two layer single ply roof membrane 10 of the type shown in the FIGURE.

Experimental

Each of the example membranes A-U were made in accordance with the following procedure:

Weigh all chemicals on a Harvard Trip Balance, excluding #2175 blue (50%) M.B., which is weighed on an analytical balance.

Each chemical, in parts by weight, are multiplied by a factor to make enough material for a mill batch. Example: Tyrin 725 CPE—50.0 parts multiplied by a factor of 3=150 grams. All chemicals in the formulation would be multiplied by 3. All weights are in grams.

Order of mixing on mill:

1. CPE polymer: (Parachlor 125×) or (Tyrin 725 CPE)
2. Polyolefin polymer: Attane 4004 or Flexomer 9065/9078 note: these items should be put in oven at 212° F. for at least 30 minutes before putting on mill to mix
3. Blending Agent: Vestenamer 8012
4. Heat Stabilizer: Versamag tech. pdr.
5. TSPP 6. Stearic Acid, Carbowax 3350 and Epalene N34P, are added to fillers, such as camel wite, micral 932SL, or omya U.F.; and the combination is then added to the mill 7. TiO2 is also added to the above process aids/filler combination, and then added to the mill 8. ERL-4221 is added with fillers. Blue M.B. is added after polymers After the batch is mixed and blended well on the mill, the batch is then calendered at 0.020''.

Temperatures vary on the mill and calender depending on the formulation.

Mill temperature 250° F. to 290°
Calender temperature 250° F. to 290°

After calendering a sheet, the calendered sheet is then heat sealed for adhesion evaluation.

Referring to Table 1, the formulations for the seventeen (17) examples A–U are shown. While the polyolefin/CPE amounts vary in relative percentages between 30–70%, the preferred range is between 49 to 51%. All of the examples exhibit excellent heat weld characteristics and are easily processed into sheets (0.015 inch) on a conventional calender.

TABLE 1

| | A | B | C | D | E | F | G | H | I | J | K | L | M | N | O | T | U |
|---|---|---|---|---|---|---|---|---|---|---|---|---|---|---|---|---|---|
| CPE TYRIN 725 | 51.0 | 51.0 | 51.0 | 51.0 | 51.0 | 50.0 | 50.0 | 50.0 | 50.0 | 50.0 | 0.0 | — | — | — | — | 30 | 70 |
| ATTANE 4004 | 49.0 | 49.0 | 49.0 | 49.0 | 49.0 | 50.0 | 50.0 | 50.0 | 0.0 | 0.0 | 50.0 | — | — | — | — | 70 | 30 |
| VERSA-MAG TECH PDR. | 6.5 | 6.5 | 6.5 | 6.5 | 6.5 | 6.5 | 6.5 | 6.0 | 6.0 | 6.0 | 6.0 | 6.0 | 6.0 | 6.0 | 6.0 | 6.5 | 6.5 |
| IRGANOX B225 | 1.0 | 1.0 | 1.0 | 1.0 | 1.0 | 1.0 | 1.0 | — | — | — | — | — | — | — | — | 1.0 | 1.0 |
| EPOLENE N34P | 2.1 | 2.1 | 2.1 | 2.1 | 2.1 | 2.1 | 2.1 | — | — | — | — | — | — | — | — | 2.1 | 2.1 |
| STEARIC ACID | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| MICRAL 932SL | — | — | — | — | 30.0 | 30.0 | 0.0 | — | — | — | — | 0.0 | 0.0 | 20.0 | 20.0 | 30.0 | 30.0 |
| ERL 4221 | 1.0 | 1.0 | 1.0 | 1.0 | 1.0 | 1.0 | 1.0 | 2.0 | 2.0 | 2.0 | 2.0 | 2.0 | 2.0 | 2.0 | 2.0 | 1.0 | 1.0 |
| VESTEN-AMER 8012 | — | — | — | — | 4.0 | 2.0 | 2.0 | 2.0 | 2.0 | 2.0 | 2.0 | | | | | 2.0 | 2.0 |
| CARBO-WAX 3350 | — | — | — | — | 1.0 | 1.0 | 1.0 | 1.0 | 1.0 | 1.0 | 1.0 | 1.0 | 1.0 | 1.0 | 1.0 | 1.0 | 1.0 |
| BLUE MB #2175 | — | .15 | .15 | .15 | 0.633 | 0.046 | 0.046 | 0.04 | 0.04 | 0.04 | 0.4 | 0.4 | 0.4 | 0.4 | 0.4 | 0.046 | 0.046 |
| TIPURE R-960 | 20.0 | 8.0 | 4.0 | 0.0 | 2.0 | 2.0 | 2.0 | 2.0 | 2.0 | 2.0 | 2.0 | 2.0 | 2.0 | 2.0 | 2.0 | 2.0 | 2.0 |
| TSPP | 5.0 | 5.0 | 5.0 | 5.0 | 5.0 | — | — | — | — | — | — | — | — | — | — | — | — |
| ULTRA PFLEX | 20.0 | — | — | — | — | — | — | — | — | — | — | — | — | — | — | — | — |
| MARK 1117 | 1.0 | 1.0 | 1.0 | 1.0 | 1.0 | — | — | — | — | — | — | — | — | — | — | — | — |
| OMYA-CARB UF | — | 26.0 | 28.0 | 30.0 | — | — | — | 20.0 | 20.0 | 20.0 | 20.0 | 20.0 | 20.0 | 20.0 | 20.0 | — | — |
| CAMEL WITE | — | — | — | — | 0.0 | 30.0 | — | — | — | — | — | — | — | 0.0 | 0.0 | — | — |
| PARACLAR 125X | — | — | — | — | — | — | — | 0.0 | 0.0 | 0.0 | 50.0 | 50.0 | 50.0 | 50.0 | 50.0 | — | — |
| FLEXOMER 9065 | — | — | — | — | — | — | — | 0.0 | 50.0 | 0.0 | 0.0 | 50.0 | 0.0 | 0.0 | 50.0 | — | — |
| FLEXOMER 9078 | — | — | — | — | — | — | — | 0.0 | 0.0 | 50.0 | 0.0 | 0.0 | 50.0 | 50.0 | 0.0 | — | — |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A polymeric membrane comprising:
   a blend of polymeric resin, said resin including about 30 to 70 parts by weight chlorinated polyethylene (CPE) resin and about 70 to 30 parts by weight crystalline polyolefin resin; and
   reinforcement fabric, said polymeric resin impregnating said reinforcement fabric.

2. The membrane of claim 1 further including:
   at least one heat stabilizer.

3. The membrane of claim 2 wherein said heat stabilizer comprises magnesium hydroxide.

4. The membrane of claim 2 wherein:
   said heat stabilizer is present in an amount of from about 1 to 5 parts by weight with respect to said polymeric resin.

5. The membrane of claim 1 further including:
   at least one blend enhancing agent.

6. The membrane of claim 5 wherein:
   said blend enchancing agent is present in an amount of from about 2 to 10 parts by weight with respect to said polymeric resin.

7. The membrane of claim 5 wherein:
   said blend enhancing agent comprises a cyclo-octene polymer.

8. The membrane of claim 1 further including at least one of the additives selected from the group comprising:
   lubricants, antioxidants, flame retardants and acid scavenger stabilizers.

9. The membrane of claim 1 wherein:
   said membrane is formed from continuous calendered sheets.

10. The membrane of claim 1 wherein:
    said crystalline polyolefin resin comprises low density polyethylene.

11. The membrane of claim 1 wherein:

said CPE is present in the range of 49-51 parts by weight; and said crystalline polyolefin resin is present in the range of 51-49 parts by weight.

12. A polymeric membrane consisting essentially of:
a blend of polymeric resin, said resin including about 30 to 70 parts by weight chlorinated polyethylene (CPE) resin and about 70 to 30 parts by weight crystalline polyolefin resin; and
reinforcement fabric, said polymeric resin impregnating said reinforcement fabric.

13. A polymeric membrane comprising:
a blend of polymeric resin, said resin including about 30 to 70 parts by weight chlorinated polyethylene (CPE) resin and about 70 to 30 parts by weight crystalline polyolefin resin; and
at least one blend enhancing agent, said blend enhancing agent comprises a cyclo-octene polymer.

14. A single ply roofing membrane comprising:
a first upper layer, and
a second lower layer fused to said upper layer, said lower layer comprising a blend of polymeric resin, said resin including about 30 to 70 parts by weight chlorinated polyethylene (CPE) resin and about 70 to 30 parts by weight crystalline polyolefin resin.

15. The membrane of claim 11 wherein said first upper layer comprises:
a blend of 35 to about 45 parts by weight of an admixture of a crosslinked amorphous chlorinated polyethylene about, 15 to about 25 parts by weight a crystalline thermoplastic polyolefin resin, said crosslinking being carried out in the presence of a vulcanizing package comprising an inorganic base and (1) 2-5 dimercapto-1,3,4-thiadiazole and an activator material or (2) a derivative of 2,5-dimercapto-1,3,4-thiadizole initially present at from about 0.5 to about 1.5 parts by weight, the residue of which is present, and from about 8 to about 15 parts by weight of semicrystalline chlorinated polyethylene dispersed therethrough as the continuous phase, forming a partially crosslinked blend elastomer which is resistant to environmental cracking.

16. The membrane of claim 14 further including:
at least one heat stabilizer.

17. The membrane of claim 16 wherein said heat stabilizer is selected from the group comprises magnesium hydroxide.

18. The membrane of claim 16 wherein:
said heat stabilizer is present in an amount of from about 1 to 5 parts by weight with respect to said polymeric resin.

19. The membrane of claim 14 further including:
at least one blend enhancing agent.

20. The membrane of claim 19 wherein:
said blend enchancing agent is present in an amount of from about 2 to 10 parts by weight with respect to said polymeric resin.

21. The membrane of claim 19 wherein:
said blend enhancing agent comprises a cyclo-octene polymer.

22. The membrane of claim 14 further including at least one of the additives selected from the group comprising:
lubricants, antioxidants, flame retardants and acid seavenger stabilizers.

23. The membrane of claim 14 further including:
reinforcement fabric, said polymeric resin impregnating said reinforcement fabric.

24. The membrane of claim 14 wherein:
said membrane is formed from continuous calendered sheets.

25. The membrane of claim 14 wherein:
said crystalline polyolefin resin comprises low density polyethylene.

26. The membrane of claim 14 wherein:
said CPE is present in the range of 49-51 parts by weight; and
said crystalline polyolefin resin is present in the range of 51-49 parts by weight.

27. A single ply roofing membrane consisting essentially of:
a first upper layer, and
a second lower layer fused to said upper layer, said lower layer comprising a blend of polymeric resin, said resin including about 30 to 70 parts by weight chlorinated polyethylene (CPE) resin and about 70 to 30 parts by weight crystalline polyolefin resin.

* * * * *